United States Patent Office 3,438,650
Patented Apr. 15, 1969

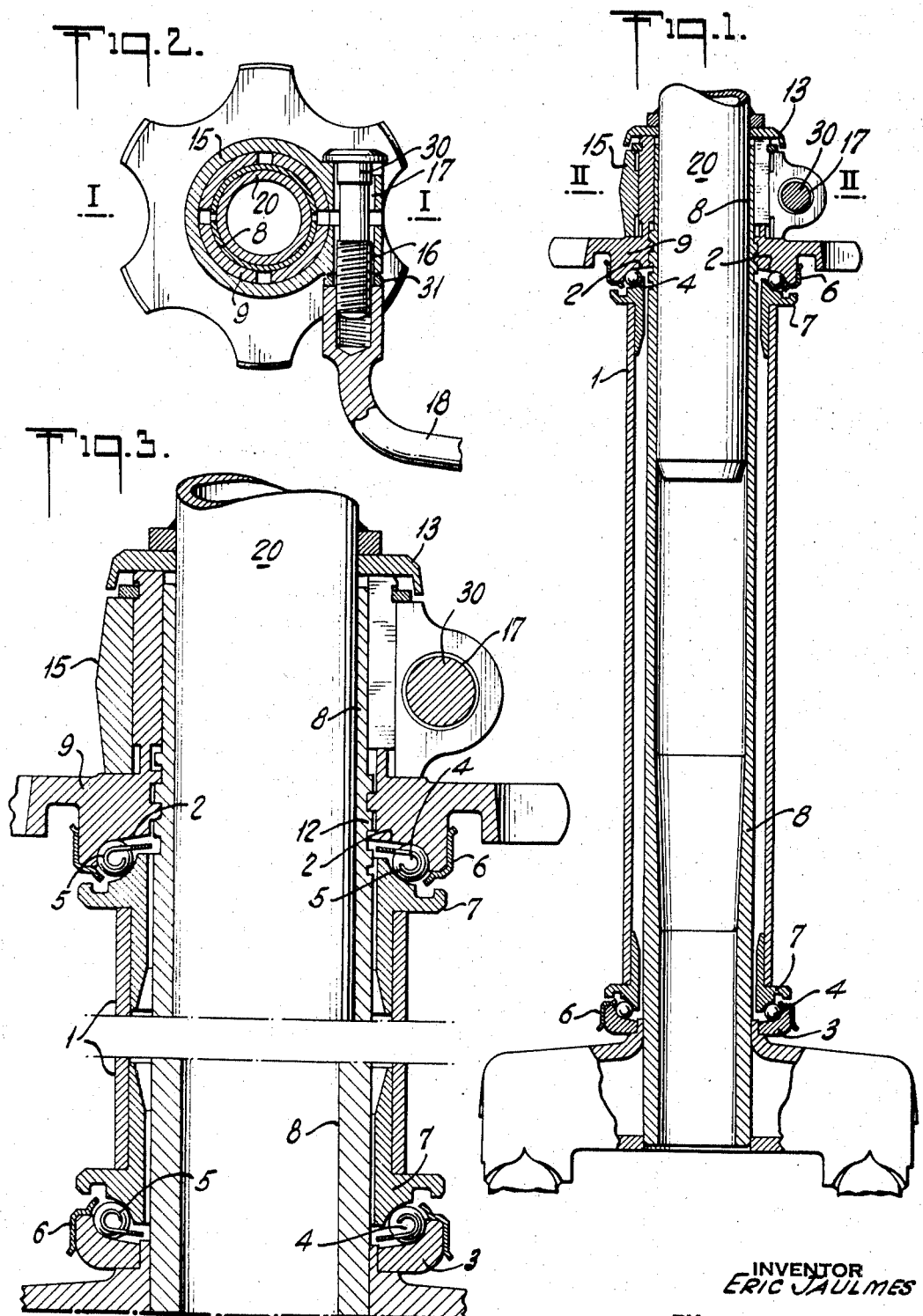

3,438,650
BEARING ARRANGEMENT FOR DISMOUNTABLE BICYCLE
Eric Jaulmes, Paris, France, assignor to Ateliers de la Motobecane, Pantin, Seine-Saint-Denis, France, a corporation of France
Filed Sept. 19, 1967, Ser. No. 668,759
Claims priority, application France, Sept. 30, 1966, 78,234
Int. Cl. B62k 3/00, 21/06
U.S. Cl. 280—279                                5 Claims

ABSTRACT OF THE DISCLOSURE

The ball bearing cup of the lower bearing is mounted on the fork or pivot tube of a dismountable bicycle and the cone of the lower bearing is mounted on the steering tube so that the cage and balls will be carried by the fork tube during disassembly. Also, the steering tube has square-shaped, high-pitched threads for bearing adjustment.

---

In a dismountable bicycle of the type according to applicant's U.S. Patent No. 3,260,535, the cup and cage portion of the thrust bearing disposed at the lower end of the steering tube, forming part of the frame of the bicycle, is secured to the lower end of the pivot tube rotatably mounted in said steering tube and forming part of the fork of the bicycle, while the cooperating cone of said bearing is affixed to the adjoining lower end of said steering tube. As a result, damage is prevented to the balls and cage of said bearing by and during withdrawal of the pivot tube, in dismantling the bicycle, from below the steering tube, in contrast to the relative mounting arrangement of the respective bearing parts according to the prior patent. For purposes of symmetry and in order to afford a better and full equalization of the forces involved in assembling and locking the bicycle parts, the same relative arrangement is employed for the upper ball thrust bearing, that is, with the cone of the latter affixed to the upper end of the steering tube and with the ball and cage portion thereof secured to or embodied in the tapped mounting head threaded upon, the upper portion of pivot tube for the firm locking of the parts in the assembled position of the bicycle. There results therefrom the further advantageous feature of the main or ball and cage portions of both bearings being secured to separate component parts of the bicycle. Other improvements apply to the close and firm adjustment of the mounting head by the use of a high-pitched screw thread and to the assembly and disassembly of the handle bar component of the bicycle.

The present invention relates to dismountable or collapsible bicycles comprised substantially of three main component parts in the form of a conventional frame unit adapted to support the rear wheel of the bicycle and including the steering tube inclined in the forward direction of a fork and pivot tube unit rotatably supported within said steering tube by means of a pair of thrust ball bearings, and a handle bar unit having a plunger tube mounted in said pivot tube.

In order to enable a ready assembly and disassembly of the component parts of the bicycle, the steering tube is fitted according to the construction of the prior patent, at both its ends with cups forming races of the ball bearings and supporting each a cage holding sets of balls, said cups being fitted with peripheral confining rings serving to retain said balls or to prevent dropping out or spilling thereof during the disassembly operations of the bicycle. Cooperating with said cups and balls on the steering tube are a pair of cone members forming the cooperating races of the bearings and being affixed to the lower end of the pivot tube, on the one hand, and to the screw-threaded mounting head secured to an upper threaded part of the pivot tube, on the other hand, said head serving to firmly lock the parts in position with the balls being subjected to a desired pressure by the respective cups and cones of the bearings. In order to automatically set the proper bearing pressure, there is provided according to the prior patent a vernier adjusting arrangement comprising a screw cap upon said mounting head to be set or adjusted during manufacture and adapted to cooperate with a stop or abutment on the steering tube during assembly of the parts, in such a manner as to result in the establishment of a predetermined bearing pressure upon screwing said head to and adjusting it to its limit position.

Other details regarding the type of bicycle forming the subject of the present invention will appear from the afore-mentioned prior patent, the disclosure of which is hereby embodied in the instant application by reference.

In the use of a construction according to the prior patent, that is, with the cup and cage portions of both thrust bearings fixedly mounted at the extreme ends of the steering tube, it has been found during disassembly of the parts, while pulling out the fork and pivot tube from below the steering tube and after unscrewing and removal of the mounting head from the upper part of the pivot tube, that the pivot tube may damage, by its sharp-edged upper end, the cage and balls of the bearing disposed at the lower end of the steering tube, especially if the pivot tube is canted rather than withdrawn in a straight line from the steering tube.

Besides, where the main ball bearing portions, comprising the cups and cages holding the balls, are mounted upon the same part of the bicycle as in the construction of the prior patent mentioned, it is necessary to maintain a close tolerance as to the relative positions of the bearings, to avoid misalignments and to prevent jamming and other difficulties during assembly of the parts.

Accordingly, an object of the present invention is the provision of an improved dismountable bicycle construction of the referred to type by which the foregoing and related difficulties are substantially overcome in a simple and economical manner.

The invention, both as to the foregoing and ancillary objects as well as novel aspects thereof, will be better understood from the following detailed description, taken in reference to the accompanying drawings forming part of this specification and in which:

FIG. 1 is a longitudinal axial sectional view, taken on line I—I of FIG. 2, of the steering tube, pivot tube and handle bar assembly of the improved bicycle construction according to the invention;

FIG. 2 is a transverse section taken on line II—II of FIG. 1; and

FIG. 3 is a more detailed fragmentary view, on a larger scale, of FIG. 1.

Like reference numerals denote like parts in the different views of the drawings.

With the foregoing object in view, the referred to difficulties and defects are overcome by the invention in a simple and effective way by a reversal of the relative arrangement of the parts of at least the lower thrust ball bearing in a dismountable bicycle structure according to the prior patent, that is, by mounting the cone of the lower bearing at the lower end of the steering tube and mounting the cup and cage portion of said bearing at the base of the pivot tube adjoining the fork. As a consequence, withdrawal of the latter from below the steering tube, in the manner described during disassembly of the parts, makes it impossible to damage the cage or balls by the latter being carried by the part being withdrawn.

In order to simplify the manufacture, storage as well as assembly of the parts, the same relative mounting, arrangement is employed for the other ball bearing disposed at the upper end of the steering tube, that is, by mounting the cone of the latter bearing at the upper end of the steering tube and by mounting the cooperating cup and cage upon the lower face of or structurally embodying the same in the mounting head, respectively. There is provided in this manner a complete symmetry of the parts at both ends of the steering tube, resulting in a equalization of the various forces or reactions involved during assembly of the parts. Besides, the main cup and cage portions of the bearings are carried by separate component parts of the bicycle, thereby avoiding the further drawbacks and defects mentioned.

Further described in the prior patent is a vernier arrangement for the adjustment of the operating pressure applied to the balls of both bearings and involving the provision of four longitudinal slots in the cylindrical portion of the mounting head being engaged by only three set screws disposed in a screw cap upon said head serving as a stop adapted to engage with an abutment of the pivot tube, in such a manner as to result in a predetermined adjustment of said head and bearing pressure upon said cap engaging said abutment during the mounting of the head. While it has been found that this arrangement ensures satisfactory results in setting a proper and definite bearing pressure, its use has been less satisfactory from a practical and economical point of view.

According to a further improved feature of the present invention, the foregoing disadvantage is eliminated by replacing the special vernier screw adjustment by a relatively high-pitched screw or mounting head for the locking of the pivot tube to the stering tube, in such a manner that simple manual tightening of said head can never result practically in any excessive axial clamping pressure liable to jam, block, or damage the ball bearings.

Finally, the dismountable bicycle according to the prior patent includes a split clamping sleeve or collar mounted upon the cylindrical portion of the mounting head for the locking of the handle bar sleeve inserted from above into the pivot tube, said collar having a pair of lateral extentions having tapped bores which are engaged by the threaded end of a bent locking lever. According to the present improvement, the bores in said extensions have a smooth inner surface and are traversed by a special locking bolt having a flange at one end engaging the outside of one of said extensions and having its opposite threaded end engaged by the tapped end of the locking lever. A ring-shaped washer may be interposed between the tapped end of said lever and the outer surface of the other extension of said collar, whereby to afford a proper and smooth adjustment of said bolt irrespective of the relative angular position of said extensions, provided an adequate clearance of said bores, these and other details of the improvements according to the instant application being understood and becoming further apparent as the description proceeds in reference to the drawings.

Referring more particularly to FIGS. 1 and 3, the numeral 1 indicates the steering tube of the bicycle forming part of the frame (not shown) and having affixed to the opposite ends thereof the cones 7 of a pair of thrust ball bearings 4 mounted in cages 5, as more clearly shown in FIG. 3. The cup 3 of the lower bearing supporting the balls 4 is secured to the base of the pivot tube 8 at its point of emergence from the fork of the bicycle supporting in a known manner the front wheel (not shown), while the cup 3 of the upper bearing supporting the balls 4 is mounted upon the undersurface of or structurally embodied in the mounting or screw head 9 threadedly engaging a corresponding outer portion of the upper end of the tube 8.

Each of the sets of balls 4 are retained or confined in their respective cups 3 by means of a peripheral retaining ring 6, to prevent droping out of the bearing or spilling of the balls during disassembly of the bicycle parts. Control of the bearing pressure is effected by more or less screwing or tightening of the head 9 down upon the pivot tube 8, while jamming or "freezing" of the parts is substantially prevented by the relatively high pitch of the threads 12 being preferably in the form of square threads, in the manner shown and pointed out before.

From the foregoing, it is seen that mounting of the lower ball bearing 3, 4, 5 on the pivot tube 8, rather than upon the steering tube 1, as in the case of the prior patent, positively precludes the possibility of damage to the balls 4 or cage 5 during withdrawal of the upper edge portion of the tube 8 from below the tube 1 while disassembling the bicycle structure. Furthermore, mounting of the upper bearing 3, 4, 5 upon the mounting head 9, rather than the upper end of the steering tube, as in the prior patent, is employed for reasons of symmetry and equalization of the forces or reactions involved during assembly and locking of the parts. At the same time, there is gained thereby the advantage of both bearing structures 3, 4, 5 being supported by separate component parts of the bicycle, thus eliminating the necessity of accurate relative alignment or positioning of the bearings, for the reason pointed out hereinabove.

FIG. 2 shows a further feature of improvement over the prior bicycle construction according to the above-mentioned patent relative to the locking of the handle bar tube 20 within the pivot tube 8. For this purpose, the inner hollow end portion of the bent locking lever 18 for the mounting of the split clamping collar 15 is internally threaded or tapped for engagement with the end of a threaded locking bolt 30 passing through a pair of smooth bores 16 and 17 in the lateral extensions of the collar 15, sufficient space or clearance being left between the bolt 30 and said bores. As a consequence, the collar 15 may be clamped unto the upper slit cylindrical portion of the mounting head 9, substantially without jamming due to misalignment of said extensions during the mounting of the parts. A washer 31 of spherical cross section may advantageously be interposed between the edge of the lever 18 and one of the extensions of the collar 15, to ensure a close engagement of the parts even in case of misalignment of the bores 16 and 17. A similar washer (not shown) may be arranged between the head of the bolt 30 and the other extension of the collar 15.

In the foregoing the invention has been described in reference to a specific illustrative device. It will be evident, however, that variations and modifications, as well as the substitution of equivalent parts or elements for those shown herein for illustration, may be made without departing from the broader scope and spirit of the invention as set forth in the appended claims. The specification and drawingst are accordingly to be regarded in an illustrative rather than in a restrictive sense.

I claim:

1. In a dismountable bicycle comprising a frame unit adapted to support a rear wheel and including a steering tube, a fork unit adapted to support a front wheel and including a pivot tube rotatably mounted in said steering tube, a bearing structure for said pivot tube comprising in combination:

(1) a first cup-shaped element forming a ball bearing race and secured to the lower end of said pivot tube adjacent to said fork, (2) a second cone-shaped element forming a cooperating ball bearing race and mounted upon the lower end of said steering tube, (3) a ball bearing cage holding a set of balls and interposed between said first and second elements, to provide a first thrust ball bearing for said pivot tube at the lower end of said steering tube, (4) a peripheral confining ring forming part of said first element, to retain said cage and balls upon said element in the disassembled position of said tubes, (5) an internally threaded locking head engaging an externally threaded portion of said pivot tube, and
(6) a further thrust ball bearing at the upper end of said steering tube similar to said first ball bearing, said further ball bearing having a pair of elements mounted upon, respectively, said steering tube and the undersurface of said mounting head.

2. A dismountable bicycle as claimed in claim 1, the cup-shaped element of said second ball bearing being mounted upon said head and the cone-shaped element of said second ball bearing being mounted upon said steering tube.

3. A dismountable bicycle as claimed in claim 1, said head and steering tube being fitted with cooperating square-shaped and relatively high-pitched threads.

4. A dismountable bicycle as claimed in claim 1, including a handle bar tube mounted in the upper portion of said steering tube, and mounting means therefor consisting of a split resilient clamping collar encircling a longitudinally slit cylindrical extension of said head and having a pair of lateral extensions provided with smooth aligned bores, a clamping bolt passed through said bores having a flange at one end engaging a first one of said extensions and having an opposite threaded portion extending outwardly beyond the second of said extensions, and a clamping lever having a hollow internally threaded end engaging said threaded bolt portion, to removably and firmly clamp said collar against said cylindrical head portion, said steering tube and said handle bar tube.

5. A dismountable bicycle as claimed in claim 4, including a locking washer of ring-shaped cross section interposed between said clamping lever and said second extension, said bores having a sufficient clearance to allow of clamping of said collar in the misaligned position thereof.

References Cited

UNITED STATES PATENTS

| | | | |
|---|---|---|---|
| 492,988 | 3/1893 | Pease | 280—279 |
| 598,402 | 2/1898 | Tripp | 308—192 |
| 1,409,748 | 3/1922 | Meiselbach | 280—279 |
| 2,998,617 | 9/1961 | Murphy | 308—190 X |
| 3,260,535 | 7/1966 | Jaulmes | 280—279 |
| 3,306,684 | 2/1967 | Klein | 308—187 |

KENNETH H. BETTS, *Primary Examiner.*

U.S. Cl. X.R.

308—192